| United States Patent [19] | [11] 3,888,876 |
| Bader et al. | [45] June 10, 1975 |

[54] NOVEL PROCESSES FOR PHOTOGRAPHIC PRODUCTS

[75] Inventors: Henry Bader, Newton Center; Alexander Boag, Arlington, both of Mass.

[73] Assignee: Polaroid Corporation, Cambridge, Mass.

[22] Filed: Aug. 29, 1973

[21] Appl. No.: 392,656

[52] U.S. Cl............................ 260/314.5; 260/317.5
[51] Int. Cl............................................ C09b 47/08
[58] Field of Search ................................ 260/314.5

[56] References Cited
UNITED STATES PATENTS

| 2,776,957 | 1/1957 | Brentano et al. ................ 260/314.5 |
| 3,138,611 | 6/1964 | Bickendraht et al. ........... 260/314.5 |
| 3,305,559 | 2/1967 | Kuhne et al. .................... 260/314.5 |

FOREIGN PATENTS OR APPLICATIONS

| 868,746 | 5/1961 | United Kingdom.............. 260/314.5 |
| 785,629 | 10/1957 | United Kingdom.............. 260/314.5 |

*Primary Examiner*—Harry I. Moatz
*Attorney, Agent, or Firm*—John P. Morley

[57] ABSTRACT

An improved process for producing metallized dye developers useful in photographic products.

10 Claims, No Drawings

NOVEL PROCESSES FOR PHOTOGRAPHIC PRODUCTS

BACKGROUND OF THE INVENTION

1. The Field of the Invention

This invention relates to an improved process for producing photographic materials. More precisely, the invention disclosed herein relates to an improved process for producing photographic dye developers especially useful in diffusion transfer photographic products.

2. Description of the Prior Art

Diffusion transfer photographic products employing dye developers are known in the art. One particular class of such dye developers as well as manners of using same in diffusion transfer products is described in U.S. Pat. No. 3,482,972 issued December 9, 1969 to E. M. Idelson. Essentially, the dye developers of U.S. Pat. No. 3,482,972 conform to the following formula:

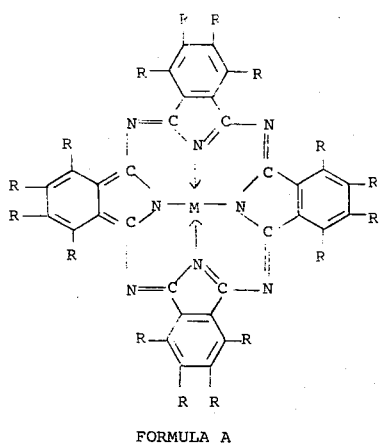

FORMULA A wherein it is provided that of the 16 R substituents present on the phthalocyanine ring at least one and no more than four are as $R^1$ groups, there being no more than two $R^1$ on any one benzene ring, the remaining R substituents being $R^2$ groups, wherein $R^1$ comprises a group $(-A)_n-E$; A is a divalent organic linking radical; n is a number of from 0 to 1 inclusive; E is an aryl group selected from the group consisting of benzene and naphthalene radicals so substituted by at least two groups selected from the group consisting of hydroxyl and amino groups which are situated ortho or para to each other as to be capable of developing an exposed silver halide photographic emulsion; M is a metal selected from the group consisting of cobalt, nickel, copper, chromium, magnesium and zinc; and each $R^2$ comprises the same or a different moiety selected from the group consisting of monovalent organic and monovalent inorganic radicals, neither of which contain a silver halide developing radical, and hydrogen. Typical examples of $R^2$ moieties include: $-SO_3H$, $-Br$, $-NH_4$, $-CH_2Cl$, and $-SO_3NH_4$. Reference is made to Chapter 5 of Moser and Thomas, Phthalocyanine Compounds, Reinhold, Copyright 1963.

A preferred class of dye developers within formula (A) comprises the compounds wherein the linking group between the phthalocyanine nucleus and a disubstitutedphenyl silver halide developing radical is

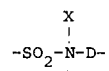

wherein X and D are as defined below.

Such compounds are represented by the formula:

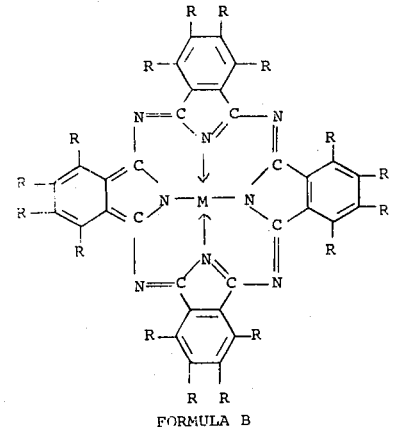

FORMULA B wherein it is provided that of the 16 R substituents present on the phthalocyanine ring at least one and no more than four are as $R^3$ groups, there being no more than two $R^3$ groups on any one benzene ring, the remaining R substituents being $R^4$ groups, wherein $R^3$ is

X is H or an alkyl group of 1-6 carbon atoms inclusive; D is an alkylene group of 1-6 carbon atoms inclusive; Q is a disubstituted phenyl silver halide developing radical; M is a metal selected from the group consisting of cobalt, nickel, copper, chromium, magnesium and zinc; and each $R^4$ comprises the same or a different moiety selected from the group consisting of monovalent organic and monovalent inorganic radicals, neither of which contain a silver halide developing radical, and hydrogen.

In the past, compounds of formula B have been prepared according to the following simplified reaction scheme:

Step 1.

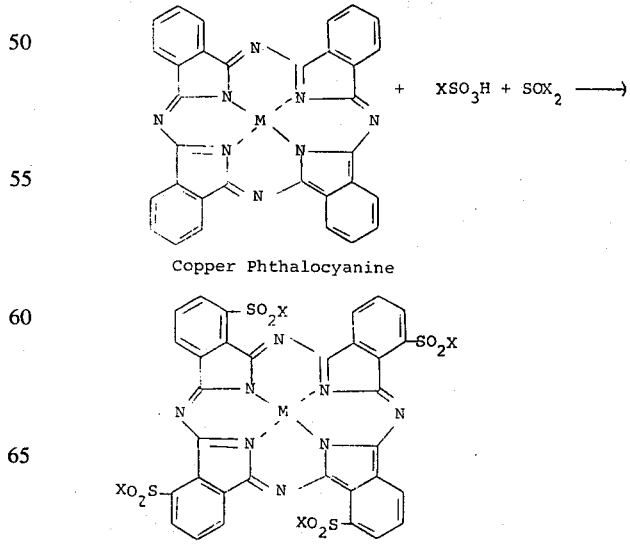

Metal phthalocyanine-3,3',3'',3'''-tetrasulfonyl halide where: X is halogen and M is defined before.

Step 2. (Homogeneous reaction)

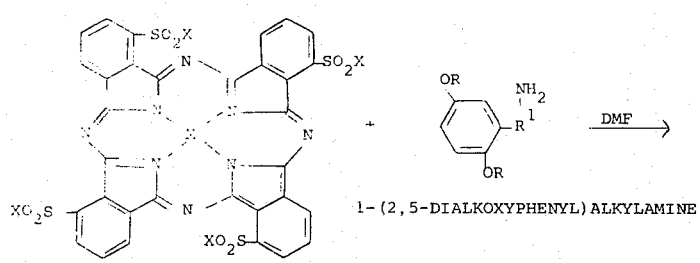

1-(2,5-DIALKOXYPHENYL)ALKYLAMINE

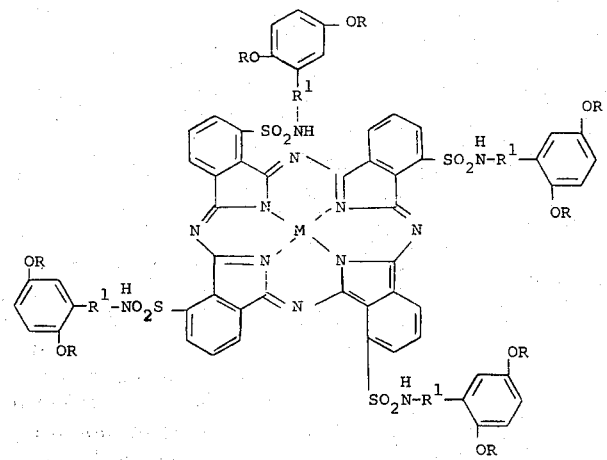

where R is an alkyl radical having from 1–6 carbon atoms and $R^1$ is an alkylene radical having from 1–6 carbon atoms.

In the process of the prior art, dimethylformamide was usually employed as the solvent in Step 2. Dimethylformamide provides a suitable homogeneous reaction medium for the metal phthalocyaninetetrasulfonyl halide and the dialkoxyphenylalkylamine; yields in the order of 40-50% or slightly higher were obtained with dimethylformamide or like homogeneous reaction media. The use of dimethylformamide, however, imposed severe constraints on the process. The most serious being that positive measures had to be employed to exclude moisture from Step 2. Otherwise, it was believed that water would compete with the alkylamine of Step 2 providing reduced yields. For example, it is known that the tetrasulfonyl halides undergo rapid hydrolysis and this hydrolysis would be accelerated in the presence of a dipolar solvent such as dimethylformamide. Accordingly, in practicing the process of the prior art, the product of Step 1 was completely dried prior to its use in Step 2. This requisite drying operation was time consuming and involved drying of the product of Step 1 in a vacuum oven over phosphorus pentoxide for three or four days followed by prolonged heating under vacuum. Additionally, such a drying operation poses difficulties especially when applied to large scale operations where increased amounts of moisture would be available to react with the tetrasulfonyl halides and this reaction would be accelerated at elevated temperatures.

The precautions employed to exclude moisture obviously impaired the overall efficiency of the prior art process especially for commercial applications. The present invention is addressed to the problem of the above-described prior art process to provide an improved process which is more acceptable to the art especially from a commercial point of view.

SUMMARY OF THE INVENTION

The process of the present invention essentially involves a modification of Step 2 of the process practiced in the prior art. Instead of using non aqueous solvents such as the dimethylformamide of the prior art processes, the reaction between the copper phthalocyaninetetrasulfonyl halide and the dialkoxyphenylalkylamine is conducted in an aqueous medium. Accordingly, the process presented in the present claims involves the following sequence of reactions:

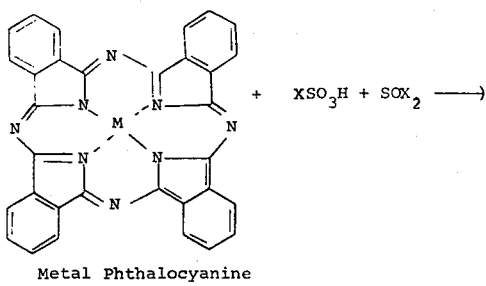

Metal Phthalocyanine

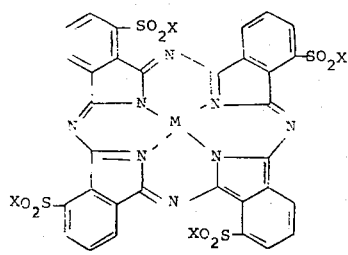

where: X is a halogen and M is as defined before.

Metal Phthalocyanine-3,3',3'',3'''-tetrasulfonyl halide

Step 2. (Heterogeneous Reaction)

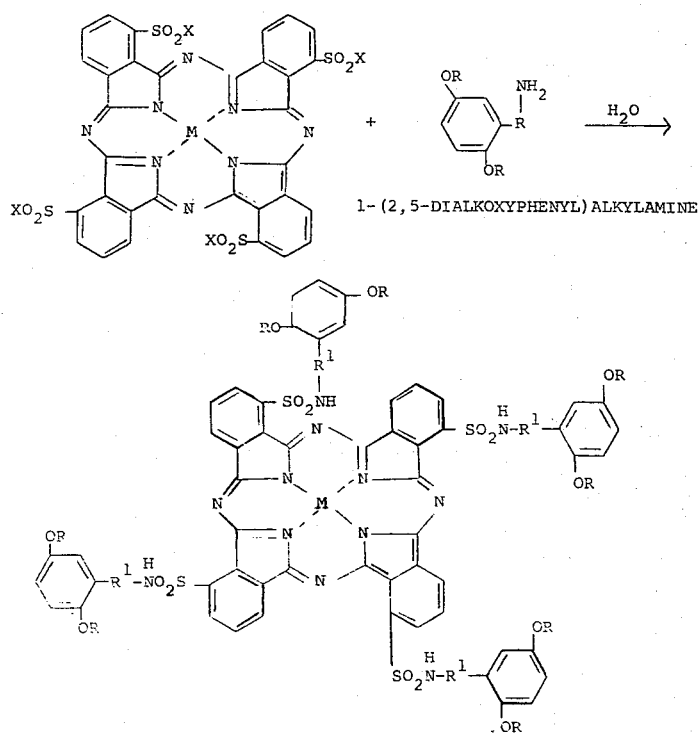

where R is an alkyl radical having from 1–6 carbon atoms and $R^1$ is an alkylene radical having from 1–6 carbon atoms.

Acid is generated during the reaction of Step 2 and accordingly, neutralizing reagents, e.g., a base such as an alkali metal hydroxide, carbonate, or a tertiary amine, etc., are preferably included in the aqueous reaction medium. The amount of reagent employed during the course of the reaction should be at least equivalent to that required to neutralize all the acid produced during the reaction. Preferably, an excess of reagent is included in the aqueous reaction medium prior to the reaction but the reagent may be added incrementally during the course of the reaction if desired.

Unlike the homogeneous reaction at Step 2 of the prior art process, the process of the present invention in which an aqueous reaction medium is employed involves a heterogeneous reaction. Essentially, with an aqueous medium it is believed that the reaction involves three separate phases. The first phase is an aqueous phase containing dissolved neutralizing reagents. The second phase involves the substantially insoluble, solid tetrasulfonyl halide, while the final phase involves suspended droplets of the dialkoxyphenylalkylamine. It is believed that the reaction between the tetrasulfonyl halide and the dialkoxyphenylalkylamine actually occurs in the amine droplet phase. This belief is consistent with our observation that the addition of solvents which are solvents for the amine and also miscible in the aqueous phase provide improved reaction rates and yields. Such solvents apparently provide the improved rates and yield by changing the existing partitions between the various phases. An example of a suitable solvent which is a solvent for the amine and which is also miscible in the aqueous phase is tetrahydrofuran. The amount of solvent added to the aqueous medium can vary but optimum yields are obtained when the amount is sufficient to provide a mixture where the solvent represents about 1 to about 50 percent by volume of the mixture and preferably from about 5 to about 30 percent by volume of the mixture.

DETAILED DESCRIPTION OF PREFERRED EMBODIMENTS OF THE INVENTION

Details relating to the process of the present invention as well as manners of practicing same will be better appreciated by reference to the following Examples. In the Examples such terminology as "Percent Crude Yield", "Percent Neutral Species" and "Percent Estimated Content Yield" are employed and these terms should be explained. "Percent Crude Yield" relates to the total yield of product obtained which comprises a mixture of electrically charged as well as neutral species and the "Percent Neutral Species" relates to the ratio of neutral material in the crude yield. In turn, the "Percent Estimated Content Yield" is obtained by multiplying the "Percent Crude Yield" by the "Percent Neutral Species" and since the neutral material is more suitable for photographic applications, the "Percent Estimated Content Yield" is an important measure of the efficiency of the overall process.

EXAMPLE 1.

The following Example illustrates a preferred method of practicing the process of the present invention.

Step 1. Preparation of Copper Phthalocyanine-3,3′,3″,3′3′′′-tetrasulfonyl halide.

Copper phthalocyanine (13.7 g., 0.0238 mole; $\epsilon$ = 34,400 at $\lambda_{max}^{H_2SO_4}$ 700 $\mu$) was added under stirring over a period of five minutes to 125 g. (1.07 mole) of chlorosulfonic acid and cooled externally with a cold water bath, at such a rate that the temperature did not exceed 40°C. The mixture was rapidly heated to 140°C. and stirred at this temperature for 5 hours. It was then cooled to 50°C., and 49.0 g. (0.41 mole) of thionyl chloride was added dropwise over a period of 30 mins. at 50°–55°C. The temperature was raised over a period of 30 mins. to 80°C., and the mixture was stirred at this temperature for an additional two hours.

After cooling to room temperature, the solution was poured slowly-over a period of 30 mins.-under vigorous stirring, into a mixture of 1600 g. of ice and 800 ml. of cold water while maintaining the temperature of 0°C. by the addition of additional ice if necessary.

The resulting mixture was kept at 0° while being filtered (40 mins. required). The precipitate was washed with 250 ml. of ice water (5 mins. required) and then damp dried for 15 mins. with a rubber dam. The product was then used immediately, directly in the next reaction step.

Step 2. Preparation of Copper Phthalocyanine-3,3′,3″,3′′′-tetrakis-N-[1-(2,5-dimethoxyphenyl)isopropyl] sulfonamide.

A wet paste of copper phthalocyanine-3,3′,3″,3′′′-tetrasulfonyl tetrasulfonyl halide (23.1 g. dry weight; 0.0238 mole) was added under vigorous stirring to 280 ml. of water and stirred for 10–15 mins. to give a uniform mixture. It was neutralized to pH 7 with 2.2 g. (0.025 mole) of solid sodium bicarbonate. To the vigorously stirred mixture was then added simultaneously, over a period of 15-20 mins., a solution of 23.2 g. (0.119 mole) of 1-(2,5-dimethoxyphenyl)isopropylamine in 55 ml. of tetrahydrofuran at a rate of 5 ml./min. and a solution of 23.2 g. (0.168 mole) of potassium carbonate in 225 ml. of water, at a rate of 10 ml./min. (The carbonate solution may be added for five minutes longer after the addition of the amine is complete). The mixture was then stirred at 25°C. for four hours. (Note: The time from the start of the precipitation of the tetrasulfonyl halide until all of the reagents have been added in the amidation step is preferably kept to a minimum-2 ½ hrs. being required in the above reaction.)

The reaction mixture was filtered and the precipitate was stirred again with 500 ml. of 1-N hydrochloric acid for 15 mins. and then refiltered and then washed with water until the filtrate was acid-free (about one liter; about 30 mins. required). It was then dried in a vacuum oven at 60°C. under 7 mm. pressure overnight.

The product weighed 36.6 g. (crude yield of 96.0 percent) and contained 84.0 percent neutral species by electrophoresis. This represents a content yield of 80.5 percent.

Ten grams of the crude product were purified by a recrystallization-precipitation procedure from 140 ml. of 1:1:1.5 dimethylformamide (DMF):pyridine:water mixture in the following manner: The crude solid was added to 80 ml. of a 1:1 DMF:pyridine mixture at 100°C., stirred for about 10 mins. at 100°C. to complete solution and then filtered. To the stirred solution was then slowly added 60 ml. of water (room temperature water was used, but preheating of water may be advantageous on a large scale) while maintaining the temperature at 100°C. The solution was then permitted to cool slowly to room temperature and then kept overnight at 5°C. The mixture was filtered under vacuum with most of the solid remaining on the bottom of the flask at a semi-gummy solid.

The product from the first recrystallization was not isolated as a dry solid, but was recrystallized a second time as above from 70 ml. of the 1:1:1.5 DMF:pyridine:water ternary solvent. The mixture was filtered under vacuum with most of the solid remaining on the bottom of the flask as a semi-gummy solid. It was then redissolved in 75 ml. of a 1:1 DMF:acetone mixture, and the solution was slowly added to 750 ml. of 1-N hydrochloric acid under stirring. The resulting precipitate was filtered under vacuum and washed with water (about 1 liter) until the filtrate was acid-free. It was dried overnight in a vacuum oven at 60°C. under 7 mm. pressure.

The product $\lambda_{max}^{DMSO}$ 680 $\mu$ $\epsilon$ = 184,900, weighed 7.0 g. and was 100 percent neutral by electrophoresis. This represents an 83.3 percent recovery of neutral species and an overall

EXAMPLE 2.

The reaction medium of Step 2 of Example 1 comprised about 10 percent by volume of tetrahydrofuran and as mentioned, such solvents provide improved "Percent Estimated Content Yields". The following Example illustrates the performance of Step 2 of the process of the present invention wherein such solvents are not included in the reaction medium.

Wet paste of copper phthalocyanine 3,3′,3″,3′′′-tetrasulfonyl chloride (16.3 g. portion, corresponding to 5.0 g. dry weight; 0.00516 mole) was added under stirring to 60 ml. of water and followed with 5.0 g. (0.0258 mole) of 1-(2,5-dimethoxyphenyl)isopropylamine, added dropwise over a period of 5 minutes at 25°C. (a very slight exotherm noted). The reaction mixture was stirred at 25°C. for 5 minutes. A solution of 4.3 g. (0.0310 mole) of potassium carbonate, dissolved in 40 ml. of water, was then added to the stirred reaction mixture over a period of 5 minutes at 25°C., and the mixture was stirred at this temperature for two hours.

The resulting mixture was filtered under vacuum, and the precipitate was washed with 1000 ml. of 2-N hydrochloric acid and then with water until the filtrate was acid-free (about 1 liter). It was then dried in a vacuum oven at 60°C. under 7 mm. pressure overnight.

The product weighed 7.9 g. (percent crude yield of 95.2 percent) and contained 68.8 percent Neutral Species by electrophoresis. This represents percent Estimated Content Yield of 65.5 percent.

EXAMPLES 3, 4 and 5.

Substantially the same procedure as in Step 2 of Example 1 was followed but the % by volume of tetrahydrofuran (THF) in the aqueous medium was varied as indicated in Table I below which summarizes the results of each Example.

TABLE 1

| Example No. | % THF By Volume | % Crude Yield | % Neutral Species | % Estimated Content Yield |
| --- | --- | --- | --- | --- |
| 3 | 15 | 94.4 | 81.0 | 76.5 |
| 4 | 10 | 96.0 | 84.0 | 80.5 |
| 5 | 6.5 | 86.5 | 80.5 | 76.5 |

From the foregoing it will be seen that the process of the present invention provides distinct advantages over those of the prior art wherein Step 2 was performed in a substantially moisture free reaction medium. As mentioned, such prior art processes provided yields in the order of 40–50 percent but specialized, time consuming operations were required to exclude moisture from Step 2. In accordance with the practice of the process of the present invention as evidenced by Example 2 acceptable yields of product can be obtained without such specialized precautions. Also, improved yields can be obtained in accordance with the aspect of the present invention where solvent-aqueous mixtures are employed as reaction media as illustrated in Examples 1, 3, 4, and 5. Accordingly, the present claims define a process for producing photographic products which is simpler, less expensive and substantially more efficient than those of the prior art.

Since certain changes apparent to the art such as reaction temperatures and reaction times or the like may be made in the above process without departing from the scope of the invention described and claimed, it is intended that all matter contained in the above description shall be interpreted as illustrative and not in a limiting sense.

What is claimed is:

1. In a process comprising the step of reacting a compound of the formula:

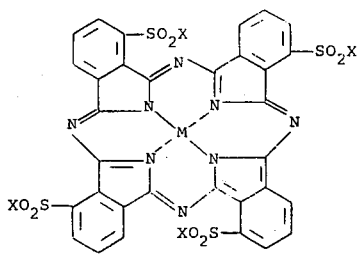

where X is a halogen and M is a metal selected from the group consisting of cobalt, nickel, copper, chromium, magnesium and zinc with an amine of the formula:

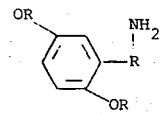

where R is an alkyl radical having from 1-6 carbon atoms to provide a compound of the formula:

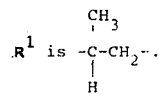

where R is an alkyl radical having from 1-6 carbon atoms and $R^1$ is an alkylene radical having from 1-6 carbon atoms; the improvement wherein the compounds are reacted in an aqueous medium comprising acid neutralizing reagents and said aqueous medium comprises from about 5 to about 25 percent by volume of a solvent which is a solvent for said amine and also miscible in said aqueous medium.

2. A process of claim 1 wherein said aqueous medium comprises a tetrahydrofuran.

3. A process of claim 1 wherein said acid neutralizing reagent comprises an alkali metal hydroxide, or an alkali metal carbonate or an alkali metal bicarbonate or mixtures of these.

4. A process of claim 1 wherein each R is —$CH_3$ and each $R^1$ is $$R^1 \text{ is } -\underset{\underset{H}{|}}{\overset{\overset{CH_3}{|}}{C}}-CH_2-.$$

5. A process of claim 1 wherein M is copper.
6. A process which comprises the steps of:
Step 1. reacting a compound of the formula:

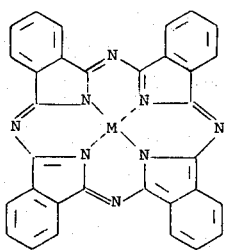

where M is a metal chosen from the group consisting of cobalt, nickel, copper, chromium, magnesium and zinc with compounds of the formulae:

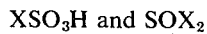

XSO₃H and SOX₂ where X is halogen to provide a compound of the formula:

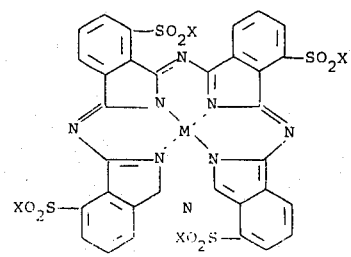

Step 2. reacting the product of Step 1 with an amine of the formula:

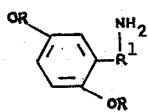

in an aqueous reaction medium comprising acid neutralizing reagents and comprising from about 5 to about 25 percent by volume of a solvent which is a solvent for said amine and also miscible in said aqueous medium to thereby provide a compound of the formula:

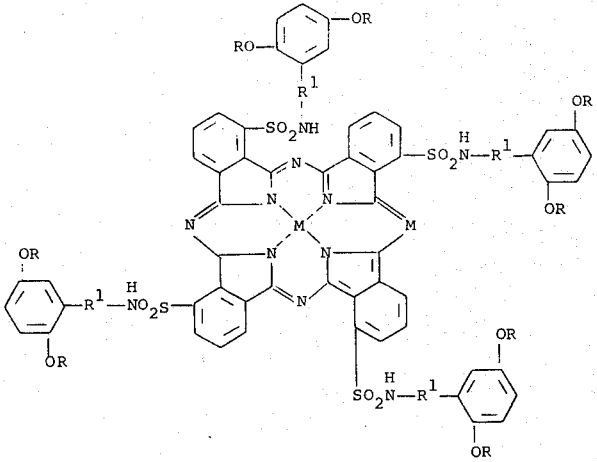

where R is an alkyl radical having from 1–6 carbon atoms and $R^1$ is an alkylene radical having from 1–6 carbon atoms.

7. A process of claim 6 wherein said aqueous medium comprises of tetrahydrofuran.

8. A process of claim 6 wherein said acid neutralizing reagent comprises an alkali metal hydroxide, or an alkali metal carbonate or an alkali metal bicarbonate or mixtures of these.

9. A process of claim 6 wherein each R is -CH₃ and each $R^1$ is

10. A process of claim 6 wherein M is copper.

* * * * *